US005653571A

United States Patent [19]
Lizenby

[11] Patent Number: 5,653,571
[45] Date of Patent: Aug. 5, 1997

[54] VERTICAL LIFT FOR A ROBOT

[75] Inventor: Kevin J. Lizenby, Traverse City, Mich.

[73] Assignee: Trantek Incorporated, Traverse City, Mich.

[21] Appl. No.: 636,313

[22] Filed: Apr. 23, 1996

[51] Int. Cl.⁶ .................................................. B65G 63/00
[52] U.S. Cl. ........................ 414/749; 901/16; 74/490.09
[58] Field of Search ............................... 414/222, 225, 414/226, 749, 751–753; 901/16, 17; 104/91, 93, 94, 95; 198/468.4; 187/226, 410; 74/490.08, 49.09

[56] References Cited

U.S. PATENT DOCUMENTS

| | | | |
|---|---|---|---|
| 4,192,986 | 3/1980 | Udagawa et al. | 901/16 X |
| 4,509,638 | 4/1985 | Kato et al. | 198/468.4 |
| 4,538,954 | 9/1985 | Luebke | 187/226 X |
| 4,600,358 | 7/1986 | Graf | 901/16 X |
| 4,781,517 | 11/1988 | Pearce et al. | 414/590 |
| 4,787,260 | 11/1988 | Bailey | 74/89.15 |
| 5,099,707 | 3/1992 | Tori et al. | 901/17 X |
| 5,107,963 | 4/1992 | Rocca et al. | 187/410 |

*Primary Examiner*—Donald W. Underwood
*Attorney, Agent, or Firm*—Howard & Howard

[57] ABSTRACT

A robot assembly 10 comprising a horizontal rail system 12 supported by a gantry 14 above the floor between two presses. A vertical lift 32 is supported for horizontal movement on the horizontal rail system 12 for supporting the pickup arms 18 and 20 by which a part P may be removed from the press on the left by the pickup tooling of arm 18 and moved to the buck 22 while the previously so disposed part P is moved from the buck 22 to the press on the right by the pickup tooling of the arm 20. The assembly is characterized by the vertical lift 32 including a pair of vertical beams 34 spaced from one another and braces 36 interconnecting the beams 34. The vertical lift 32 includes a pair of vertical rails 38 attached to the beams 34 and the horizontal carriage includes right and left-hand roller housings 40 and 42 supporting transverse 44 and lateral 46 rollers in rolling engagement with the vertical rails 38 for guiding the vertical movement of the vertical lift 32.

19 Claims, 5 Drawing Sheets

5,653,571

VERTICAL LIFT FOR A ROBOT

TECHNICAL FIELD

The subject invention relates to robot assemblies of the type for moving parts between workstations and, more particularly, to a vertical lift in a horizontal and vertical robot system.

BACKGROUND OF THE INVENTION

A typical use of such robot assemblies is for transferring parts as sheet metal stampings from pressing station to pressing station in adjacent presses, i.e., the robot assembly is positioned between the presses. The robot assembly includes a horizontal rail system for supporting a horizontal carriage which, in turn, supports a vertical lift for vertical movement relative to the horizontal lift. The vertical lift supports arms extending in opposite directions with tooling on the ends of the arms for picking up the part from one press and depositing it on a buck positioned between the presses while simultaneously picking up the previous part from the buck and depositing it in the second press. Such pressing operations are to very close tolerances and therefore the transfer of the parts must be very precise. In addition, the robot assemblies are cycled continuously and should not be susceptible to sloppy or loosely guided movement. It has been customary to guide the vertical movement by rods which slide through bushings, as shown in U.S. Pat. No. 4,781,517 to Pearce et al; however, a sloppy fit of the rods in the bushings and/or bending of the rods results in imprecise movement.

SUMMARY OF THE INVENTION AND ADVANTAGES

A robot assembly comprising a horizontal rail system, a horizontal carriage supported on the horizontal rail system for horizontal movement, and a vertical lift supported by the carriage for vertical movement relative thereto. The assembly is characterized by the vertical lift including a pair of vertical beams spaced from one another and braces interconnecting the beams.

The truss-like structure provides a very stable lift for precise positioning of the tools and, therefore, precise movement of parts from station to station during prolonged periods of cycling.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
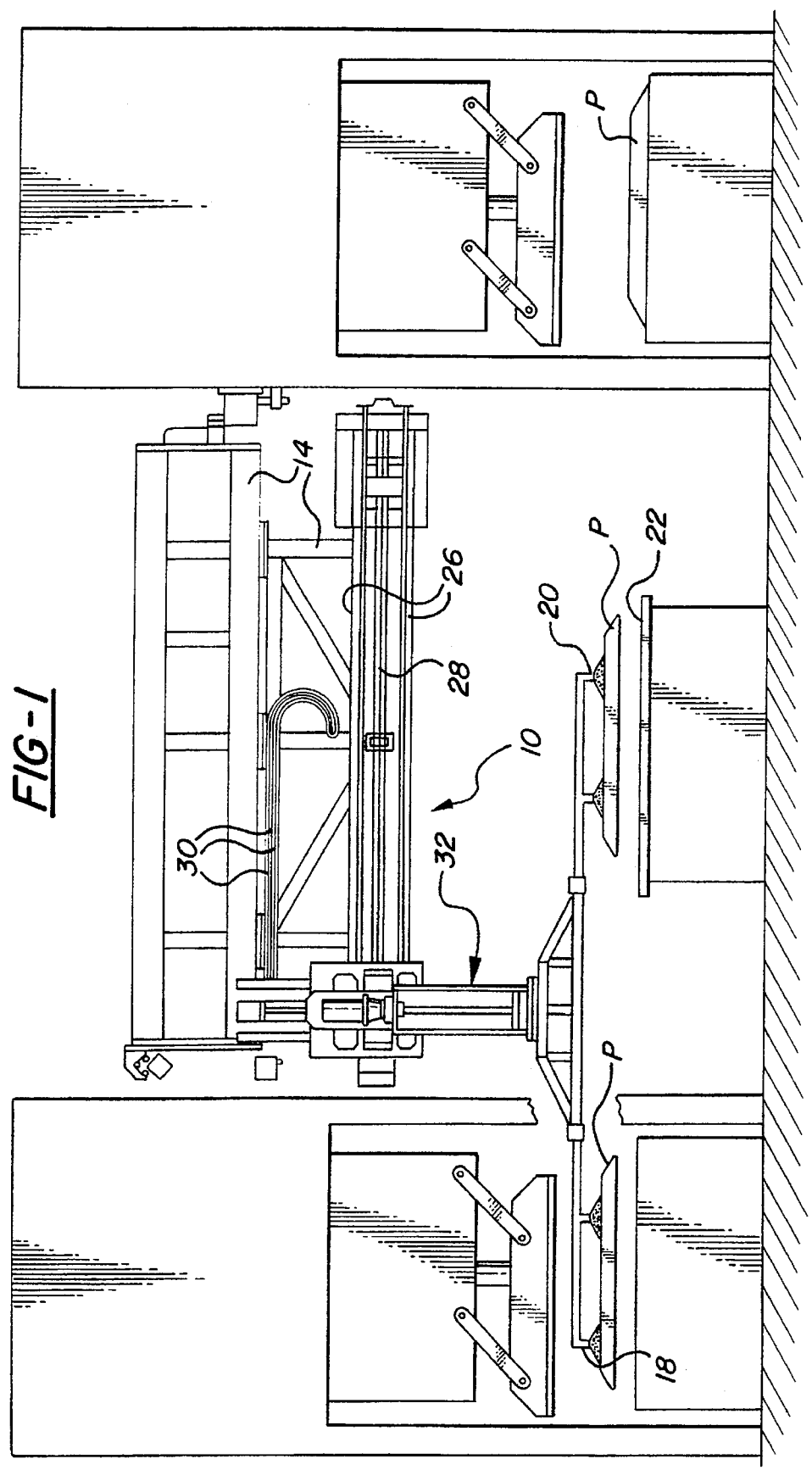
FIG. 1 is an elevational view showing the robot assembly positioned for transferring parts between two presses.
Figure 2:
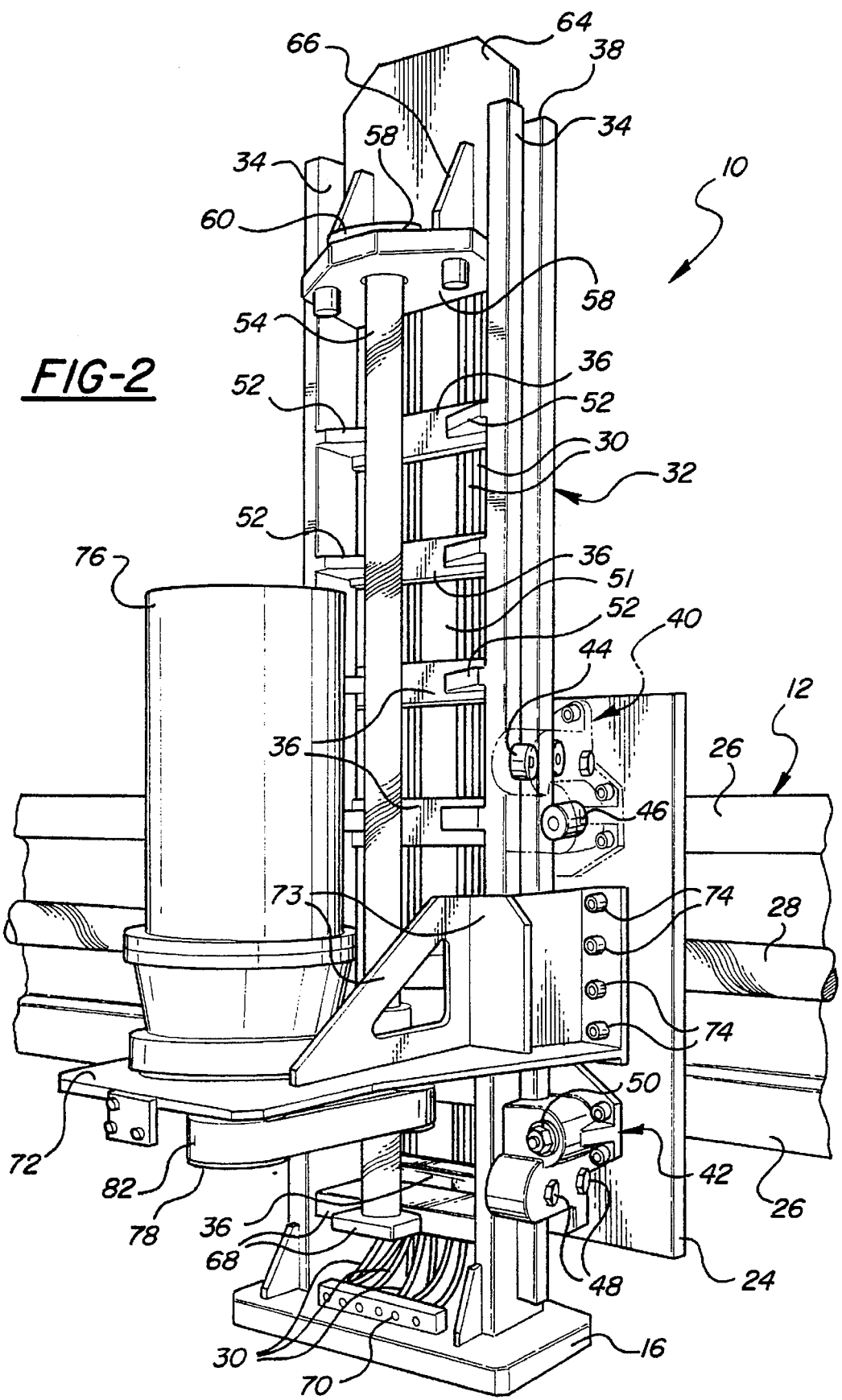
FIG. 2 is a fragmentary perspective view of the vertical lift of the subject assembly.
Figure 3:
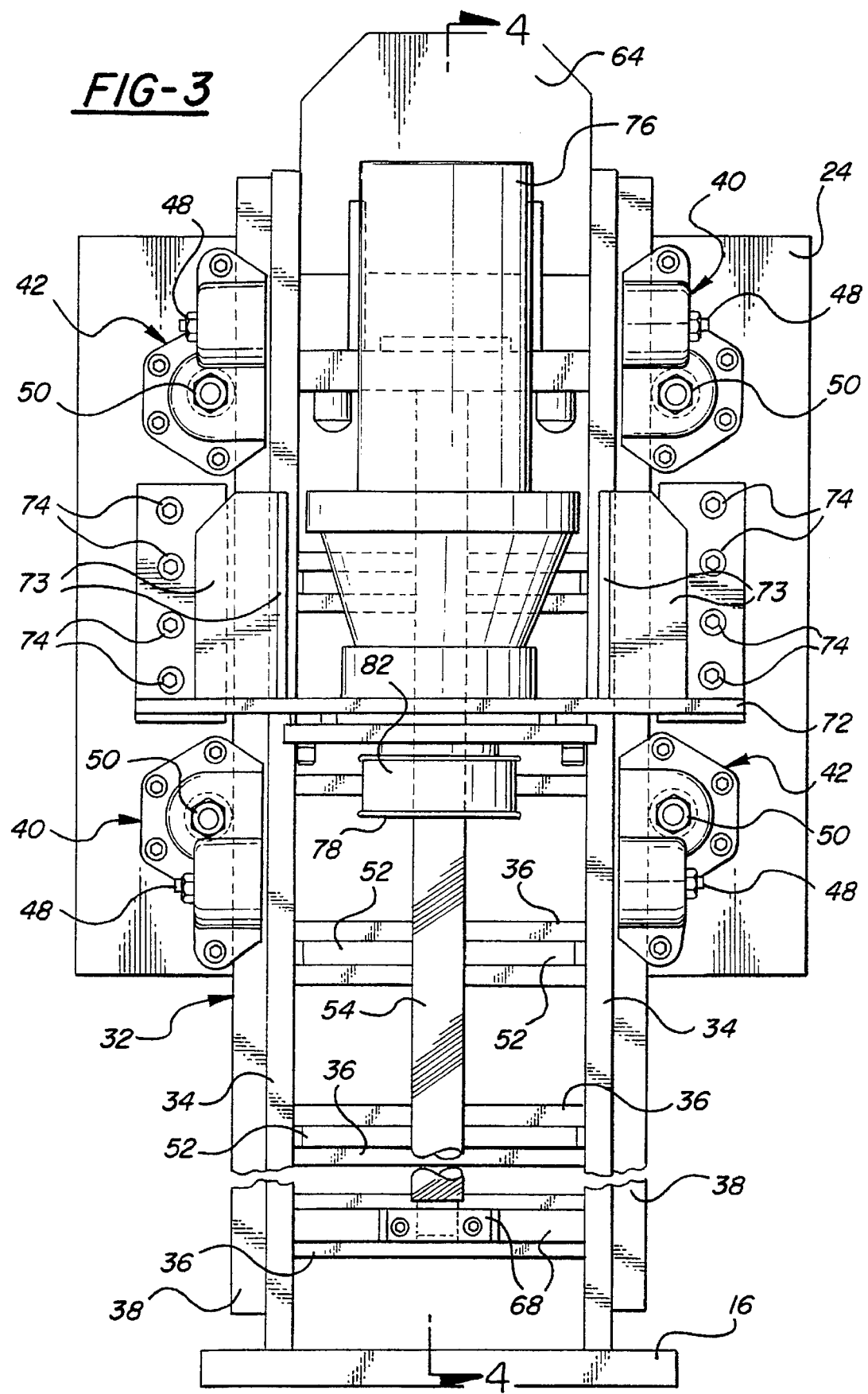
FIG. 3 is a front elevational view of the assembly shown in FIG. 2.
Figure 4:
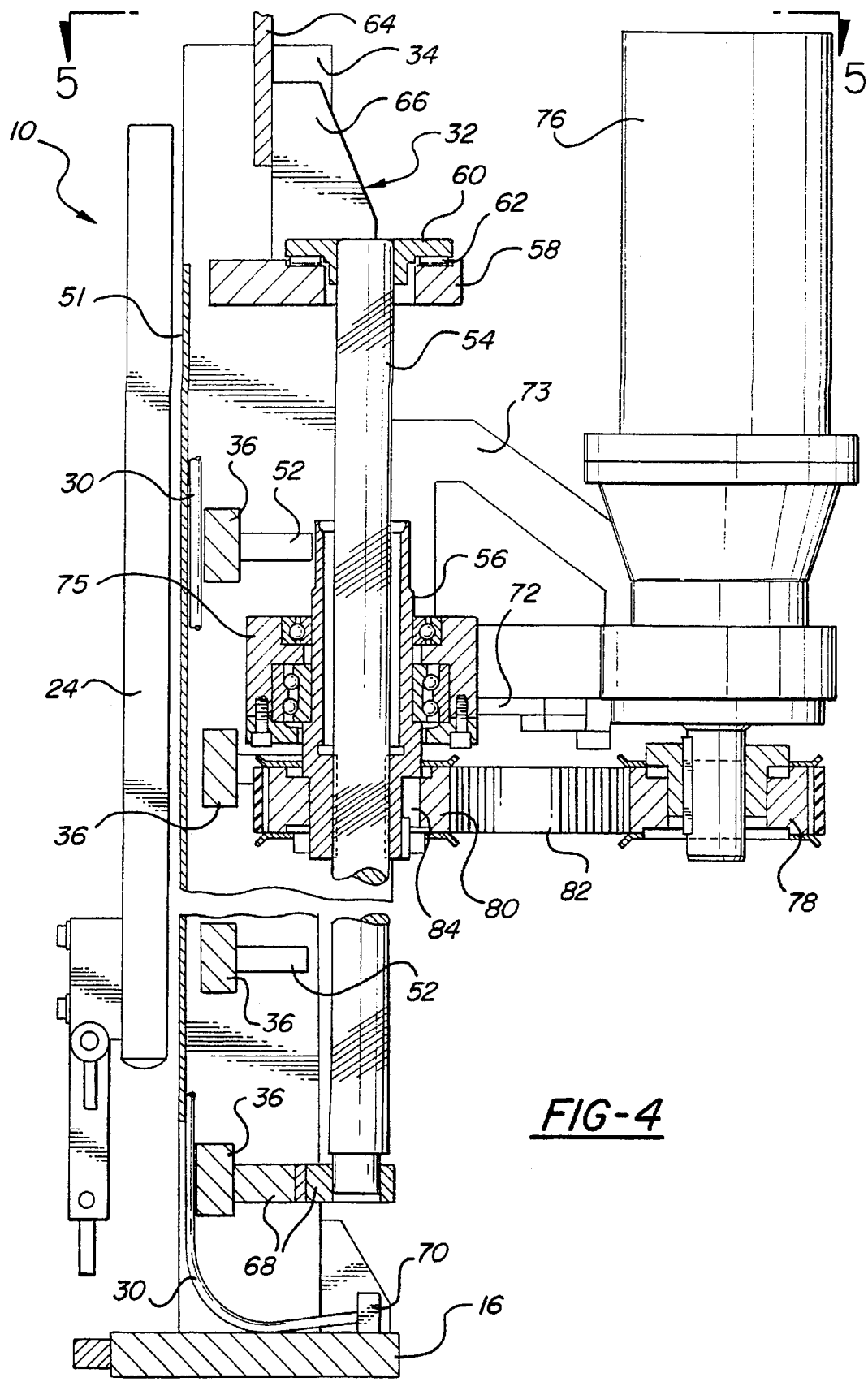
FIG. 4 is a cross sectional view taken substantially along line 4—4 of FIG. 3.

Referring to the Figures, wherein like numerals indicate like or corresponding parts throughout the several views, a robot assembly constructed in accordance with the subject invention is generally shown at 10. The robot assembly 10 comprises a horizontal rail system generally indicated at 12 in FIGS. 1 and 2. A bridge-like framework or gantry 14 suspends the horizontal rail system 12 above the floor between two presses. The robot assembly 10 presents a tooling plate 16 for supporting the pickup arms 18 and 20 whereby a part P may be removed from the press on the left by the pickup tooling of arm 18 and moved to the buck 22 while the previously so disposed part P is moved from the buck 22 to the press on the right by the pickup tooling of the arm 20.

To accomplish this movement, the assembly 10 further comprises a horizontal carriage including a carriage plate 24 supported on the horizontal rail system 12 for horizontal movement. The horizontal rail system 12 includes upper and lower rails 26 and a threaded screw shaft 28. The horizontal carriage 12 includes guides in the form of rollers or sliding guideways in engagement with the rails 26 for guiding horizontal movement of the carriage plate 24. A drive nut (not shown) is rotatably supported on the rear of the carriage plate 24 and is in threaded engagement with the horizontal shaft 28 for moving the carriage plate 24 back forth horizontally. A plurality of control lines 30, electrical, hydraulic, and the like, coil and uncoil as the carriage plate 24 moves back and forth to supply the control functions or commands for all movements of the assembly 10.

Figure 5:
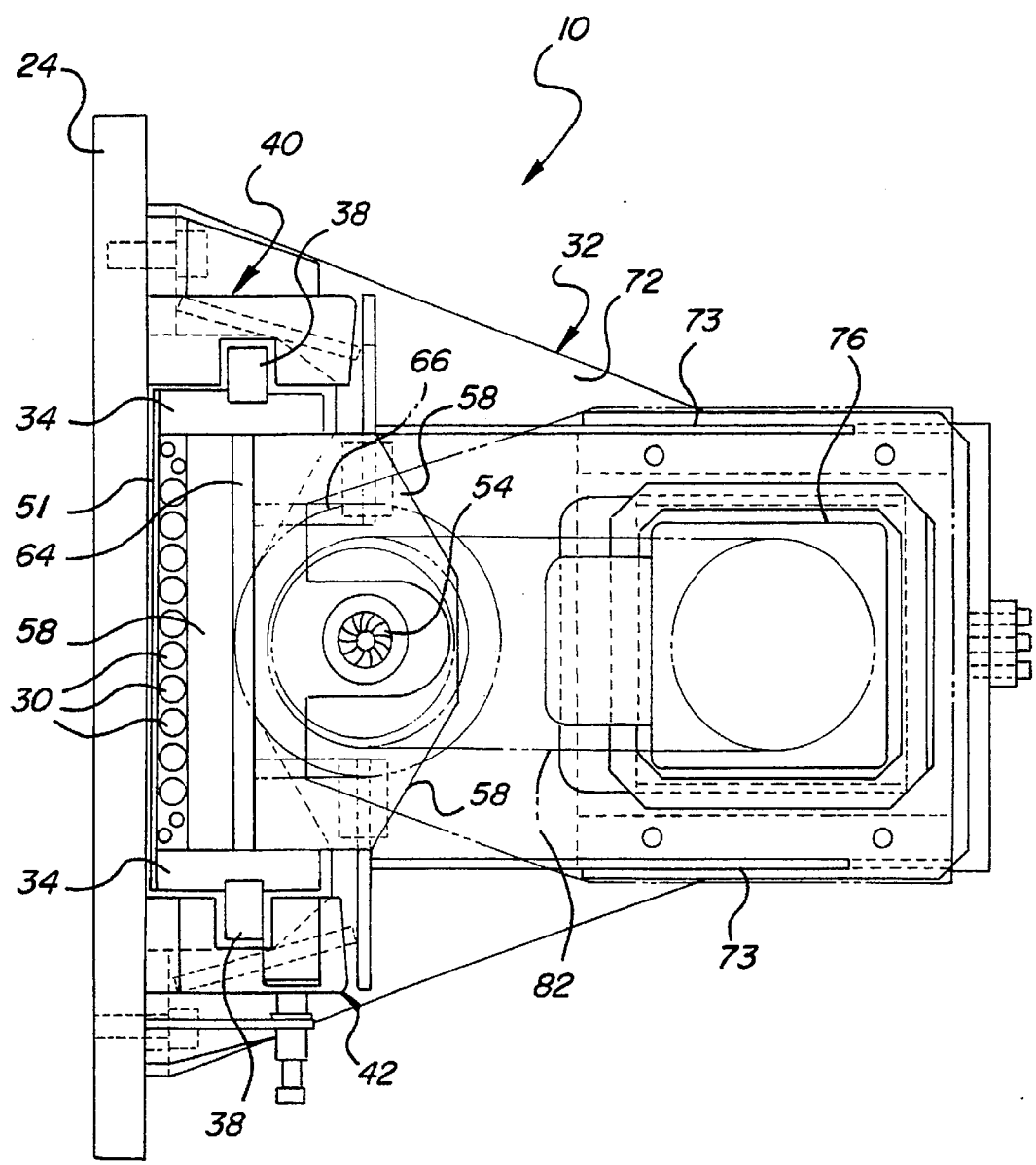
FIG. 5 is a top view taken substantially along line 5—5 of FIG. 4.

A vertical lift is generally indicated at 32 and is supported by the carriage plate 24 for vertical movement relative thereto. The assembly characterized by the vertical lift 32 including a pair of vertical beams 34 spaced from one another and braces 36 interconnecting the beams 34. The vertical lift 32 includes a pair of vertical rails 38 attached to the beams 34 and the horizontal carriage includes guides generally indicated at 40 and 42 and in engagement with the vertical rails 38 for guiding the vertical movement of the vertical lift 32. Each of the vertical rails 38 is rectangular in cross section to define a base attached to the associated beam 34 by being disposed in a complementary groove in the beam 34 and welded in place, as viewed in FIG. 5. The rectangular cross section also provides each vertical rail 38 with a pair of side surfaces extending from the base and an outwardly facing lateral surface interconnecting the side surfaces.

Each of the guides 40 and 42 comprise a roller housing secured to the carriage plate 24 and rotatably supporting a pair of the transverse guide rollers 44 in rolling engagement with the opposite side surfaces of each of the vertical rails 38 for limiting horizontal movement of the vertical lift 32 in the direction transverse to the horizontal rails 26. Each roller housing also supports one lateral roller 46 in rolling engagement with the lateral surface of the associated rail 38 to limit horizontal movement of the vertical lift 32 in the direction laterally and parallel to the horizontal rail 26. The transverse guide rollers 44 are rotatably supported on the axles 48 which are supported by the roller housing and are parallel to the horizontal rails 26 and the lateral guide rollers 46 are rotatably supported on the axles 50 which are also supported by the roller housing and are transverse to the horizontal rail 26. The transverse rollers 44 are in horizontally spaced relationship to one another and one lateral roller 46 is perpendicular to the transverse rollers 44 in each roller housing. Also, the lateral roller 46 is vertically spaced from the associated pair of transverse rollers 44 in each of the roller housings. The roller housings 40 have a right-hand configuration disposed on the right-hand side of the vertical lift 32 to engage one of the vertical rails 38 and the roller housings 42 have a left-hand configuration on the left-hand side of the vertical lift 32 to engage the other one of the vertical rails 38. The right-hand roller housings 40 are mirror images of the left-hand roller housings 42. The assembly includes an upper pair of the roller housings 40 and 42 and a lower pair of the roller housings 40 and 42 for guiding each of the vertical rails 38 at vertically spaced positions. The upper roller housing for guiding one of the vertical rails 38 is the same as the lower roller housing for guiding the other of the vertical rails 38. In other words, the roller housings are disposed in an X pattern with the diagonally opposite corners of the X having like housings 40 or 42. The roller housings 40 and 42 are secured to the carriage plate 24 by bolts (not numbered).

The vertical lift 32 includes a back panel 51 extending between the beams 34 and each beam 34 is rectangular in cross section to form a U-shape with the back panel 51 as viewed in cross section to provide a space between the braces 36 and the panel 51 for routing supply lines 30 vertically through the vertical lift 32. Gussets 52 interconnect the beams 34 and the braces 36.

A vertical drive means moves the vertical lift 32 vertically relative to the carriage plate 24 and includes a threaded shaft 54 non-rotatably supported between the beams 34 and a nut 56 supported by the carriage and in threaded engagement with the shaft 54. An upper support plate 58 interconnects the beams 34 and the upper end of the threaded shaft 54 is non-rotatably secured to the upper support plate 58 by a cap 60 keyed to the upper plate 58 by keys 62. The keys 62 define locking means interconnecting the upper end of the shaft 54 and the upper support plate 58 for preventing rotation of the shaft 54. A mounting plate 64 interconnects the top of the beams 34 and the upper support plate 58, gussetts 66 reinenforce this connection by extending between the mounting plate 64 and the upper support plate 58. A lower support plate 68 interconnects the beams 34 and supports the lower end of the shaft 54.

The tooling plate 16 is secured to the bottom of the beams 34 for supporting the tooling arms 18 and 20. A control line terminal 70 is disposed on the tooling plate 16 for connecting the control lines 30 to the tools on the arms 18 and 20.

A shelf 72 is attached by bolts 74 to the carriage plate 24 on opposite sides of the vertical lift 32 and vertically between the roller housings 40 and 42 on each side of the vertical lift 32. The shelf 72 extends in a cantilevered fashion from the carriage plate 24 and the nut 56 is rotatably supported by the shelf 72 through a bearing housing 75. Gussets 73 reinenforce the cantilevered shelf 72. The drive means also includes a motor and gear box 76 supported on the shelf 72 and in driving engagement with the nut 56. More specifically, the motor/gearbox rotates the drive pulley 78 which, in turn, rotates the nut pulley 80 through a drive belt 82. The nut pulley 80 is keyed to the nut 56 by a key 84.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A robot assembly (10) comprising:

a horizontal rail system (12);

a horizontal carriage (24) supported on said horizontal rail system for horizontal movement;

a vertical lift (32) supported by said carriage for vertical movement relative thereto;

said vertical lift (32) including a pair of vertical beams (34) spaced from one another and braces (36) interconnecting said beams (34);

said vertical lift (32) including a pair of vertical rails (38) attached to said beams (34) with each of said vertical rails (38) having a base attached to said associated beam (34) and a pair of side surfaces extending from said base and an outwardly facing lateral surface interconnecting said side surfaces;

said horizontal carriage (24) including guides (40 and 42) in engagement with said vertical rails (38) for guiding said vertical lift in said vertical movement with each of said guides including a pair of transverse guide rollers (44) in rolling engagement said opposite side surfaces of the associated one of said vertical rails (38) for limiting horizontal movement of said vertical lift (32) in the direction transverse to said horizontal rail system (12) and a lateral roller (46) in rolling engagement with said lateral surface of said associated one of said vertical rails (38) to limit horizontal movement of said vertical lift (32) in the direction laterally and parallel to said horizontal rail system (12) as said vertical rails (38) are retained between opposing lateral rollers (46).

2. An assembly as set forth in claim 1 including vertical drive means (76, 78, 80 and 82) interconnecting said vertical lift (32) and said carriage (24) for moving said vertical lift (32) vertically relative to said carriage (24).

3. An assembly as set forth in claim 2 wherein said drive means includes a threaded shaft (54) non-rotatably supported between said beams (34) and a nut (56) supported by said carriage and in threaded engagement with said shaft (54).

4. An assembly as set forth in claim 3 wherein said drive means includes a motor (76) supported on said carriage (24) and in driving engagement with said nut (56).

5. An assembly as set forth in claim 4 wherein each guide includes a roller housing (40, 42) rotatably supporting its pair of said transverse rollers (44) in horizontally spaced relationship to one another and its lateral roller (46) perpendicular to said transverse rollers (44).

6. An assembly as set forth in claim 5 wherein each lateral roller (46) is vertically spaced from said pair of transverse rollers (44) in each of said roller housings (40, 42).

7. An assembly as set forth in claim 6 wherein said roller housings include a roller housing (40) having a right hand configuration disposed on the right hand side of said vertical lift to engage one of said vertical rails (38) and a mirror image roller housing (42) having a left hand configuration on the left hand side of said vertical lift (32) to engage the other one of said vertical rails (38).

8. An assembly as set forth in claim 7 wherein said roller housings include an upper pair of roller housings (40, 42) and a lower pair of roller housings (40, 42) for guiding each of said vertical rails (38) at vertically spaced positions.

9. An assembly as set forth in claim 8 wherein said upper roller housing (40) for guiding one of said vertical rails (38) is a mirror image of the lower roller housing (42) for guiding the same vertical rail (38).

10. An assembly as set forth in claim 9 wherein said carriage includes a plate, said roller housings (40, 42) being secured to said plate (24).

11. An assembly as set forth in claim 10 including a shelf (72) attached to said plate (24) on opposite sides of said vertical lift (32) and vertically between said roller housings (40, 42) on each side of said vertical lift and extending in a cantilevered fashion from said plate (24), said nut (56) being rotatably supported by said shelf (72).

12. An assembly as set forth in claim 11 wherein said drive means includes a motor (76) supported on said shelf (72) and in driving engagement with said nut (56).

13. An assembly as set forth in claim 11 wherein said vertical lift (32) includes a back panel (51) extending between said beams (34).

14. An assembly as set forth in claim 13 wherein each of said beams (34) is rectangular in cross section and forming an U-shape with said back panel (51) as viewed in cross section to provide a space between said braces and said panel for routing supply lines (30).

15. An assembly as set forth in claim 14 including gussets (52) interconnecting said beams (34) and said braces (36).

16. An assembly as set forth in claim 15 including an upper support plate (58) interconnecting said beams (34), the upper end of said threaded shaft (54) being secured to said upper support plate (58).

17. An assembly as set forth in claim 16 including locking means (62) interconnecting said upper end of said shaft (54) and said upper plate (58) for preventing rotation of said shaft (54).

18. An assembly as set forth in claim 16 including a lower support plate (68) interconnecting said beams (34) and supporting the lower end of said shaft (54).

19. An assembly as set forth in claim 18 including a tooling plate (16) secured to the bottom of said beams (34) for supporting tooling (18, 20).

* * * * *